June 6, 1944.  F. E. BURGESS  2,350,445
ENDLESS TRACK CONSTRUCTION
Filed March 18, 1942   3 Sheets-Sheet 1
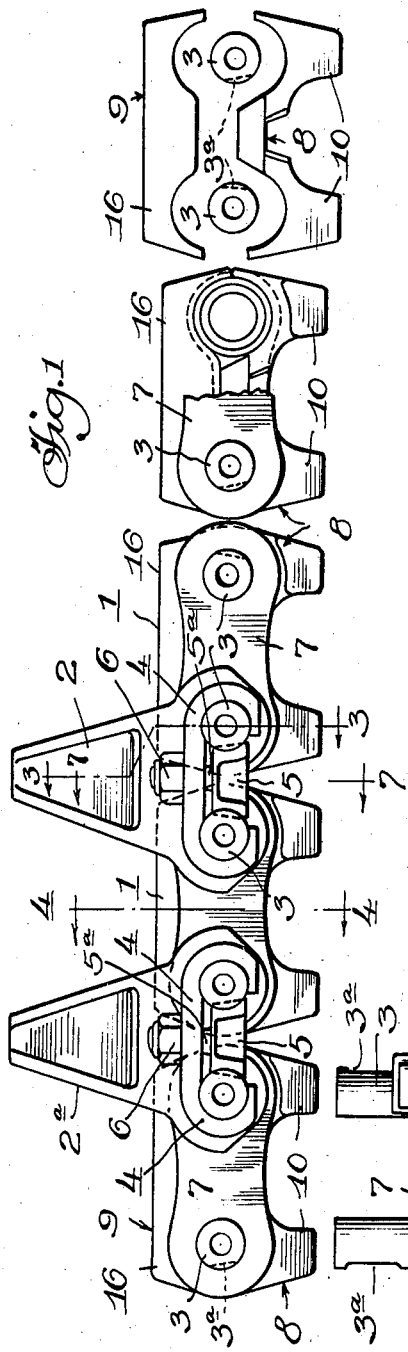
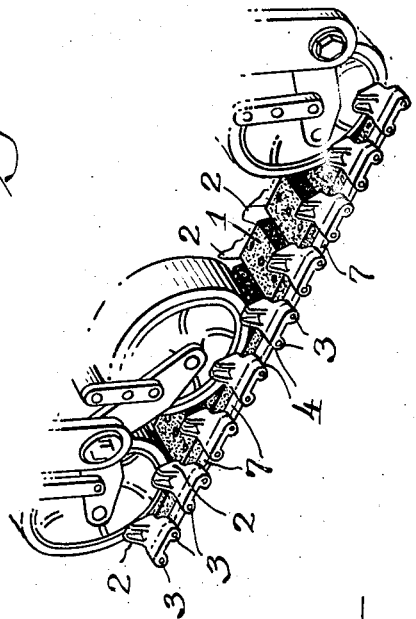
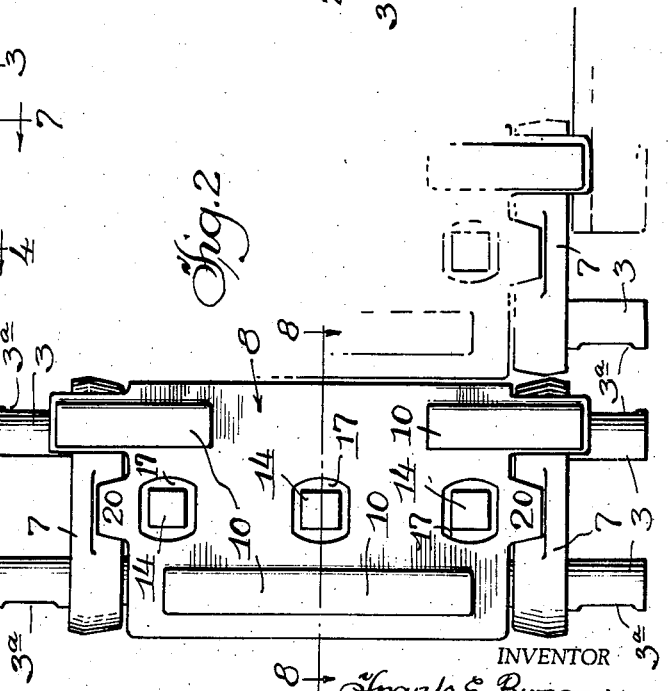
INVENTOR
Frank E. Burgess June 6, 1944.　　　　F. E. BURGESS　　　2,350,445
ENDLESS TRACK CONSTRUCTION
Filed March 18, 1942　　　3 Sheets-Sheet 2

INVENTOR.
Frank E. Burgess

June 6, 1944.  F. E. BURGESS  2,350,445
ENDLESS TRACK CONSTRUCTION
Filed March 18, 1942  3 Sheets-Sheet 3
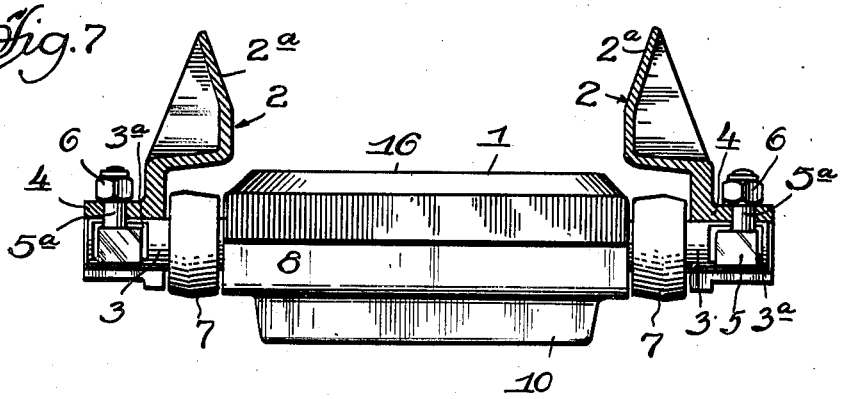
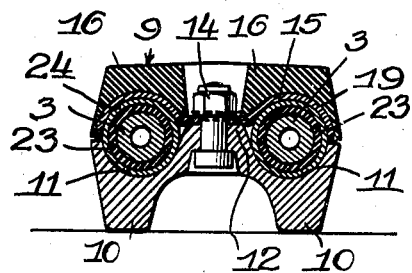
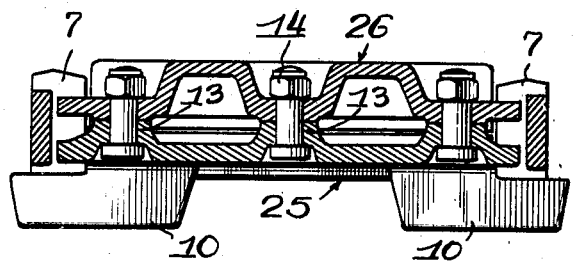
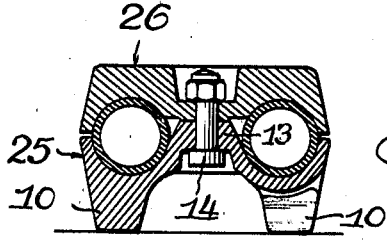
INVENTOR.
Frank E. Burgess, Patented June 6, 1944

2,350,445

UNITED STATES PATENT OFFICE 2,350,445

ENDLESS TRACK CONSTRUCTION

Frank E. Burgess, Geneva, Ill., assignor to Burgess-Norton Manufacturing Company, Geneva, Ill., a corporation of Illinois Application March 18, 1942, Serial No. 435,207

7 Claims. (Cl. 305—10)

This invention relates to improvements in endless track construction and more particularly to an improved construction for the links or track units that make up the endless tracks of a tank or like vehicle.

The object of the invention is to provide a more durable track structure and one especially designed to withstand the punishment and hard usage to which tanks and like vehicles for war use are subjected.

A further object of the invention is to provide a novel design for the individual track units which will permit the ready demounting of the parts for the purpose of replacing a broken or worn out shoe, for example, without removing the entire track from the vehicle.

A further and more specific object of the invention is to provide a novel construction and arrangement of detachable shoe members capable of being substituted for a certain form of molded rubber tread member at present utilized in a standard form of track unit for army tanks. This standard form of track unit consists essentially of a block of rubber molded about a metallic frame consisting of two parallel metallic pivot members extending transversely of the block and connected at opposite ends by metal bars. In carrying out my invention I provide a novel form and arrangement of clamping shoes which may be applied directly to the metal framework of the standard tread unit, so as to provide a metal outer surface and a rubber inner surface or an all-metal shoe as desired.

Replacement of the standard rubber block type shoe in whole or in part by a metal tread surface in accordance with my invention has become important in certain instances where it has been found that the rubber tread blocks have been rendered unserviceable and must be quickly replaced with a more permanent and durable tread surface.

Certain preferred embodiments of the invention are disclosed in the accompanying drawings, in which Figure 1 is a view in side elevation of several track links in the lower lead of an endless track;

Figure 2 is a bottom plan view of several connected track units;

Figure 3 is a view in vertical section through one of the track links as taken on line 3—3 of Figure 1;

Figure 4 is a view in vertical section taken centrally through one of the track links on line 4—4 of Figure 1;

Figures 5 and 6 are top and bottom plan views of the clamping plate forming the upper half of the track unit assembly;

Figure 7 is a view in vertical section similar to Figure 3, but taken on line 7—7 of Figure 1;

Figure 8 is a view in vertical cross section through one of the track units as taken on line 8—8 of Figure 2;

Figure 9 is a view in longitudinal section through a modified design in which the clamping member is all metal;

Figure 10 is a view in cross section through the modified track unit; and

Figure 11 is a fragmentary perspective view showing the track as mounted on an army tank.

The endless track tread for vehicles consists of an endless track or belt on each side of the vehicle and supported at opposite ends on large sprocket wheels mounted at the front and rear of the vehicles. The tractive portion of the endless track is the lower lead, and in order to hold the track in contact with the ground, a series of idler or bogie wheels are carried on the vehicle frame and bear against the inner face of the track in contact with the ground. In a common form of army tank now in use, the bogie wheels are provided with a rubber periphery adapted to engage the inner surface of the rubber block type track units, as shown in Figure 11.

The present track construction follows in many respects the standard design, the departures being essentially in the design, material and method of assembling the individual track units. Thus, as shown in Figure 1, the portion of an endless track consists of a series of identical track members or units 1 joined or linked together by short connectors 2 having tapered fingers 2ª projecting upwardly along opposite edges of the track, there being a pair of these fingers between each pair of track units so as to form a guideway for the bogie wheels to ride on the inner track surface.

Considering now the assembly of a single track unit, the base or foundation may be said to be a pair of steel pivot pins 3, 3 extending transversely of the track proper, each track unit being carried on and mounted on each successive pair of pins, and more particularly, to the pairs of pins spaced farther apart, it being noted that the distance between each pair of pin-centers is uniform, as clearly shown in Figure 1.

As a means for linking the track units together through the medium of the connectors 2, the pins 3, 3 are flattened on one side just inwardly from their ends. Their flattened faces or seats 3ª face laterally and alternately in opposite directions, it being noted that each pair of pins supporting each track unit has its flattened seats 3ᵃ facing outwardly in opposite directions. And, as shown in Figures 1 and 2, each connector 2 has an outwardly projecting collar 4, elongated longitudinally to embrace the ends of the more closely spaced pins 3. In this manner, the adjacent track units are linked together and, to make the link connection fast, a wedge-shaped block 5 extends upwardly between the ends of the pins, with their inclined ends seating against the flat seats 3ᵃ of the pins 3. This block is mounted at the lower end of a bolt 5ᵃ passing through an aperture in the collar 4 and surmounted by a nut 6, which when turned down holds the wedge block firmly in position.

In addition to linking the track units together at both ends by means of the connectors 2, it is also desirable to link the pins of each track unit together by means of a pair of links 7, 7 which slip over the ends of the pins and lie just inside the connectors 2 and are mounted on the pins in a manner presently to be described.

In any case, it is to be noted that by linking the pivot pins 3 together at their ends, the resulting structure is an endless chain to which the tread or track members are to be fastened, although it will be noted that the pivot pins 3 are enclosed within rubber sleeves which in turn are covered with metal tubes or sleeves, both of which are integral parts of the pivot pins as presently will be pointed out. In short, one feature of this track arrangement is the fact that the foundation of the track structure is a sturdy chain made up of the rubber and metal covered pins 3, the links 7 and connectors 2, organized to carry the endwise tractive load, and to which are bolted the bottom shoes and clamping plates to make a tread member which may be attached or detached without disturbing the main flight of the chain.

Thus, referring now to the mounting of the track plates, it is to be noted that these plates occupy the space between the connectors and constitute the tread of the endless track.

Referring to Figure 4, the track member consists of a traction shoe 8 and a clamping plate 9, the former being essentially a rectangular steel plate flat on its bottom except for a suitable arrangement of lugs 10, 10. The top surface of the shoe is fashioned with a pair of half round channels 11, 11 extending lengthwise on either side of its center line, the latter being marked by a ridge 12 in which are three equally spaced bolt-holes formed in shallow cylindrical upset pillows 13, thus leaving a space below to accommodate the heads of the bolts 14 which hold the shoe and its clamping plate together.

The top member or clamping plate 9 is also rectangular in shape and is preferably of a composition construction, namely, a metal base 15 and a rubber outer facing 16, the latter affording a rubber-to-rubber contact with bogie wheels with rubber rims. The metal base plate 15 is stamped or otherwise formed in an irregular zig-zag contour from end to end, thus providing along its center line a series of three low spots 17 with bolt holes 17ᵃ therein, and intermediate arched sections 18 extending transversely the full width of the plate (Figure 6). And, as in the case of the shoe 8, the side or marginal portions of the plate are shaped in half round channels 19, 19, to to fit around the upper sides of the pins 3, 3.

The rubber face plate 16 vulcanized to the back of the plate 15 is a block of rubber flat on its top surface and beveled around its edges as shown in Figure 5. The block is cored out at three points along its center line to provide sockets 16ᵃ for the nuts of the locking bolts 14. Moreover, at the ends of the face block 16 are rectangular extensions 20, 20 somewhat thicker than the rest of the block. Embedded in those extensions are upturned tang-like fingers 21, 21 formed at the ends of the base plate 15. And, finally, these extended projections of rubber 20 are enlarged in bulk sufficiently to be pressed firmly against the end links 7, 7 of the shoe assembly and even to be extruded slightly into the spaces between the ends of the shoe 8 and the links as indicated at 22 in Figure 4. In this manner, the rubber under compression tends to keep the dirt outside the shoes, and to eliminate lost motion between parts and thus promote a relatively compact shoe assembly.

Bearing in mind that each shoe assembly is supported upon a pair of pivot pins 3, 3, the mounting of the rubber sleeve and metal tube on the pins 3 will now be described in connection with Figure 3:

In the first place, each rubber sleeve 23 of perhaps ¼ inch thick is vulcanized on each pin and is surrounded by the metal sleeve 24, both rubber and metal sleeves extending the full length of the pins between connectors 2, 2. On the ends of each metal sleeve are fitted the ends of the links 7, 7, these being fixed to the metal sleeve by brazing or otherwise.

From this disclosure it will be noted that the rubber sleeves interposed between the shoe proper and the supporting pins 3, 3 serve as a torsion member allowing a limited turning or displacement of the parts as the shoe contacts varying surface or road conditions, and as a consequence removes the stresses in the shoe assembly which otherwise results in broken parts.

As a preferred arrangement for clamping the traction shoe 8 and its clamping plate 9 firmly on the metal sleeves 24, 24, said shoe and plate are formed so that when they are initially placed on said sleeves the opposed pillows 13 and low spots 17, respectively, are spaced slightly apart from each other as indicated in dotted lines in Figure 8. When the shoe and plate are finally bolted together, the said pillows and low spots are drawn together, as shown in full lines in Figure 8, thus securing the two members firmly in place under yielding tension.

Notwithstanding the improved design for the track units, it is anticipated that under the war conditions tanks and like vehicles will suffer damaged tracks, but confined, it is hoped, to the breakage of shoe plates, and with the supporting chain relatively intact. In such instance, the matter of repair is relatively simple, consisting merely of removing the bolts and clamping the shoe members in place, discarding the old parts and replacing them with new. Thus the ease of making quick changes is a primary consideration in devising the improved track unit assembly herein described, particularly where it may be necessary to change over completely from one type of tread to another, as for example, the change from all-rubber to metal or composite treads.

In this connection it follows that considerable latitude of design is permissible, as for instance in the modification shown in Figures 9 and 10 wherein both shoe 25 and clamping plate 26 are all metal, the clamping plate in particular being a one-piece casting, forging or stamping as best suited for the purpose. The contour of the all-metal clamping plate 26 may be the same as the composition rubber and metal plate. In fact, the two may well be interchangeable in use, with the rubber face plate having as its chief advantage the presentation of a rubber surface on which the bogie wheels ride, and such other advantages as may be obvious in the use of a partially compressible substance.

Having therefore set forth the merits and advantages of the structure embodying my invention, I claim:

1. A track unit for an endless track construction comprising a pair of spaced parallel tubular pivot bearing members and side links rigidly connecting said pivot members together at opposite ends to form an open frame, said pivot bearing members having pivot pins extending therethrough adapted for linked connection to similar pivot pins of adjacent track units, and a metal tread-forming member supported on said pivot bearing members and embracing the outer faces of the latter in endwise supporting relation at opposite ends of said track unit, said tread-forming member including ground-engaging means projecting beyond the bottom surfaces of said connecting links, and a bearing surface disposed above said links.

2. A track unit for an endless track construction comprising a pair of spaced parallel tubular pivot bearing members and links rigidly connecting said pivot bearing members together at opposite ends to form an open frame, said pivot bearing members having pivot pins extending therethrough adapted for linked connection to similar pivot pins of adjacent track units, and a metal tread-forming member comprising upper and lower portions supported on said pivot bearing members and embracing the outer faces of the latter at opposite ends of said track unit in endwise supporting relation and spanning the space between said pivot members above and below the latter, and means disposed in the space between said pivot bearing members rigidly connecting the upper and lower portions of said tread-forming member together.

3. In an endless track construction, an endless chain made up of a plurality of track units, each comprising a pair of spaced parallel tubular pivot-bearing members and side links rigidly connecting said pivot-bearing members together at opposite ends to form an open frame, and pivot pins extending through said pivot-bearing members having linked connections at opposite ends to similar pivot pins of adjacent track units so that said frames and linked connections carry the longitudinal tractive effort of said chain, and a metal tread-forming member consisting of a shoe and a face plate, each having opposed transverse channels at opposite ends thereof clamped together to embrace a pair of pivot-bearing members in endwise supporting relation, and removable therefrom without disturbing the said frame and pivotal connecting means of said chain.

4. A track unit for an endless track construction, comprising a pair of spaced parallel tubular pivot-bearing members and links rigidly connecting said pivot-bearing members together at opposite ends to form an open frame, said pivot-bearing members having pivot pins extending therethrough adapted for linked connection to similar pivot pins of adjacent track units, and a tread-forming member for said track unit consisting of a shoe and a face plate each having opposed transverse channels at opposite ends thereof embracing said pivot-bearing members in endwise supporting relation, and means for securing the shoe and face plate together and to said pivot-bearing members independently of said side links so as to permit removal from said pivot-bearing members without disturbing the said frame and its linked connections to adjacent track units.

5. A track unit for an endless track construction, comprising a pair of spaced parallel tubular pivot-bearing members and side links rigidly connecting said pivot-bearing members together at opposite ends to form an open frame, said pivot-bearing members having pivot pins extending therethrough adapted for linked connection to similar pivot pins of adjacent track units, and a metal tread-forming member for said track unit consisting of a shoe and a face plate each having transverse channels at opposite ends thereof for embracing the opposite sides of said pivot-bearing members in endwise-supporting relation, and means extending through the open frame of said track unit for clamping said shoe and face plate together in mutually supporting relation, whereby said tread-forming member may be assembled or disassembled from its track unit without disturbing the said frame and its linked connection to adjacent track units.

6. A track unit for an endless track construction, comprising a pair of spaced parallel tubular pivot-bearing members and side links rigidly connecting said pivot-bearing members together at opposite ends to form an open frame, said pivot-bearing members having pivot pins extending therethrough adapted for linked connection to similar pivot pins of adjacent track units, and a metal tread-forming member for said track units consisting of a bottom shoe and an upper bearing plate each having transverse channels at opposite ends thereof for embracing the opposite sides of said pivot-bearing members in endwise supporting relation, and means carried by said tread-forming members and extending through the open frame of the track unit providing mutual supporting connection between said bottom shoe and upper bearing plate so as to transmit the vertical load from the bearing plate directly to said shoe.

7. A track unit for an endless track construction, comprising a pair of spaced parallel tubular pivot-bearing members and side links rigidly connecting said pivot-bearing members together at opposite ends to form an open frame, said pivot-bearing members having pivot pins extending therethrough adapted for linked connection to similar pivot pins of adjacent track units, and a metal tread-forming member wholly supported on said pivot-bearing members independently of said side links and embracing the outer faces of said pivot-bearing members in endwise supporting relation at opposite ends of said track units, said tread-forming member including ground engaging means projecting beyond the bottom surfaces of said end links, and a bearing surface disposed above said links.

FRANK E. BURGESS.